(12) United States Patent
Kim et al.

(10) Patent No.: US 8,929,314 B2
(45) Date of Patent: Jan. 6, 2015

(54) METHOD FOR TRANSMITTING PREAMBLE, SYNCHRONIZATION METHOD OF WIRELESS NODE AND APPARATUS THEREOF

(75) Inventors: Jung Hyun Kim, Daejeon-si (KR); Ji Hung Kim, Daejeon-si (KR); Hyun Jae Kim, Incheon-si (KR); Kwang Jae Lim, Daejeon-si (KR); Dong Seung Kwon, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 184 days.

(21) Appl. No.: 13/551,160

(22) Filed: Jul. 17, 2012

(65) Prior Publication Data

US 2013/0182656 A1      Jul. 18, 2013

(30) Foreign Application Priority Data

Jan. 16, 2012   (KR) .................. 10-2012-0004953

(51) Int. Cl.
*H04W 56/00*      (2009.01)
(52) U.S. Cl.
USPC ........................................ 370/329; 370/350
(58) Field of Classification Search
USPC ........... 370/210, 329, 350, 503; 375/354, 364
See application file for complete search history.

(56) References Cited

U.S. PATENT DOCUMENTS

| | | | |
|---|---|---|---|
| 2011/0199889 A1* | 8/2011 | Han et al. | 370/210 |
| 2011/0312340 A1* | 12/2011 | Wu et al. | 455/456.1 |
| 2011/0317780 A1* | 12/2011 | Kang et al. | 375/260 |
| 2012/0039272 A1* | 2/2012 | Lee et al. | 370/329 |
| 2012/0157155 A1* | 6/2012 | Cho et al. | 455/522 |
| 2012/0195282 A1* | 8/2012 | Choi et al. | 370/329 |
| 2013/0301467 A1* | 11/2013 | Kang et al. | 370/252 |

* cited by examiner

*Primary Examiner* — Paul H Masur
(74) *Attorney, Agent, or Firm* — Rabin & Berdo, P.C.

(57) ABSTRACT

The embodiments of the present invention are directed to a method and apparatus that synchronize radio nodes using preambles in a radio communication system. An embodiment of the present invention relates to a method of transmitting preambles by a radio node. The method includes generating a first preamble indicating a system bandwidth and a carrier configuration, generating a second preamble indicating a segment identifier used for obtaining a node identifier, allocating the first preamble to a first preamble carrier set, allocating the second preamble to a second preamble carrier set corresponding to the segment identifier, and transmitting the first preamble to a receiving node through the first preamble carrier set and the second preamble to the receiving node through the second preamble carrier set.

18 Claims, 6 Drawing Sheets

METHOD FOR TRANSMITTING PREAMBLE, SYNCHRONIZATION METHOD OF WIRELESS NODE AND APPARATUS THEREOF

CROSS-REFERENCE TO RELATED APPLICATION

This application claims priority to Korean Patent Application No. 10-2012-0004953 filed on Jan. 16, 2012, the contents of which are herein incorporated by reference in its entirety.

BACKGROUND OF THE INVENTION

1. Technical Field

The embodiments of the present invention are directed to a radio communication system and more specifically to a method and apparatus that synchronize radio nodes using preambles in a radio communication system.

2. Discussion of the Related Art

In general cellular communication systems, up to three distinctive preamble carrier sets are provided at a frequency axis to distinguish adjacent cells. However, more preamble carrier sets are required in an environment where multiple neighboring nodes communicate with each other, e.g., in a mesh network system. In the case of using, as is, preambles used for an ordinary cellular communication system, nodes using the same preamble carrier set may cause serious interference to each other thus rendering it difficult to perform synchronization through the preambles.

Synchronization processes through ordinary preambles are individually performed for each node rather than being done for the entire neighboring nodes at the same time. When interference signals from other nodes are stronger than signals from the to-be-synchronized nodes, capability of synchronization may undergo serious influence. Accordingly, there is a need for a method that can exactly perform synchronization when multiple nodes simultaneously perform synchronization in an environment where multiple adjacent nodes communicate with each other or when a single node conducts synchronization in an interference environment.

SUMMARY OF THE INVENTION

Exemplary embodiments of the present invention provide a preamble that can distinguish a plurality of adjacent nodes from each other, a method of simultaneously synchronizing the plurality of nodes using preambles, and a synchronization method in an interference environment.

1. An embodiment of the present invention relates to a method of transmitting preambles by a radio node. The method includes generating a first preamble indicating a system bandwidth and a carrier configuration, generating a second preamble indicating a segment identifier used for obtaining a node identifier, allocating the first preamble to a first preamble carrier set, allocating the second preamble to a second preamble carrier set corresponding to the segment identifier, and transmitting the first preamble to a receiving node through the first preamble carrier set and the second preamble to the receiving node through the second preamble carrier set. The segment identifier is one of a plurality of candidate segment identifiers. The second preamble carrier set is determined based on the number of the plurality of candidate segment identifiers.

2. In 1, the number of the plurality of candidate segment identifiers may be equal to or more than four.

3. In 1, the second preamble may be divided into $N_{SB}$ sub-blocks, and each of the sub-blocks may be mapped with the second preamble carrier set and transmitted.

4. In 3, when an FFT (Fast Fourier Transform) size is 512, the second preamble may be divided into six basic sub-blocks including A, B, C, D, E, and F and mapped with the second preamble carrier set in order of A, B, C, D, E, and F.

5. In 4, when the FFT (Fast Fourier Transform) size is 1024, the second preamble may have the basic sub-blocks repeated in order of D, E, F, A, B, C, D, E, F, A, B, and C and be mapped with the preamble carrier set.

6. In 4, when the FFT (Fast Fourier Transform) size is 2048, the second preamble may have the basic sub-blocks repeated in order of D, E, F, A, B, C, D, E, F, A, B, C, D, E, F, A, B, C, D, E, F, A, B, and C and be mapped with the preamble carrier set. 7. In 1, the second preamble carrier set 2stPreambleCarrierSet$_n$ may be determined as follows:

$$2ndPreambleCarrierSet_n = n + N_{MN} \cdot k_2 + \gamma \cdot \frac{N_2}{\beta} + \text{floor}\left(\frac{2 \cdot k_2}{N_2}\right)$$

wherein, $N_{MN}$ is the number of the plurality of candidate segment identifiers, n is an index that indicates a segment identifier and has a value between 0 and $N_{MN}-1$, $k_2$ is a running index between 0 and $N_2-1$, $\gamma$ is an offset, $N_2$ is the number of subcarriers included in the second preamble carrier set, $\beta$ is the number of subcarriers allocated to the second preamble when an FFT (Fast Fourier Transform) is 512, and floor(c) is an integer equal to or less than c.

8. Another embodiment of the present invention relates to a method of synchronizing radio nodes. The method include receiving a first preamble indicating a system bandwidth and carrier configuration and a second preamble indicating a segment identifier used for obtaining a node identifier, compensating for an initial time and fractional frequency offset estimated by auto-correlating the first preamble, and compensating for an integer frequency offset estimated by differentially correlating a plurality of candidate preambles and the second preamble, respectively. The segment identifier is one of the plurality of candidate segment identifiers. The second preamble is one of the plurality of candidate preambles and transmitted through a second preamble carrier set determined based on the number of the plurality of candidate segment identifiers.

9. In 8, the number of the plurality of candidate segment identifiers may be equal to or more than four. 10. In 8, the method may include detecting a transmitting node of the second preamble by differentially correlating the plurality of candidate preambles and the second preamble, respectively, compensating for a fine time offset estimated using the second preamble and a preamble having a node identifier corresponding to the transmitting node among the plurality of candidate preambles, and compensating for a fine frequency offset estimated using the second preamble.

11. In 8, the method may include detecting a transmitting node of the second preamble by differentially correlating the plurality of candidate preambles and the second preamble, respectively, and compensating for a fine time offset and a fine frequency offset estimated using the second preamble and a preamble having a node identifier corresponding to the transmitting node among the plurality of candidate preambles.

12. Yet another embodiment of the present invention relates to a radio node. The radio node include a RF (Radio Frequency) unit configured to transmit and receive a radio signal, and a processor configured to detect a first preamble transmitted through subcarriers included in a first preamble carrier set, wherein the first preamble indicates a system bandwidth and carrier configuration, and to detect a second preamble transmitted through subcarriers included in a second preamble carrier set, wherein the second preamble indicates a segment identifier used for obtaining a node identifier. The segment identifier is one of a plurality of candidate segment identifiers. The second preamble carrier set is determined considering the number of the plurality of candidate segment identifiers.

13. In 12, the number of the plurality of candidate segment identifiers may be equal to or more than four.

14. In 12, the second preamble may be divided into $N_{SB}$ sub-blocks, and each of the sub-blocks may be mapped with the second preamble carrier set and transmitted.

15. In 14, when an FFT (Fast Fourier Transform) size is 512, the second preamble may be divided into six basic sub-blocks including A, B, C, D, E, and F and mapped with the second preamble carrier set in order of A, B, C, D, E, and F.

16. In 15, when the FFT (Fast Fourier Transform) size is 1024, the second preamble may have the basic sub-blocks repeated in order of D, E, F, A, B, C, D, E, F, A, B, and C and be mapped with the preamble carrier set.

17. In 15, when the FFT (Fast Fourier Transform) size is 2048, the second preamble may have the basic sub-blocks repeated in order of D, E, F, A, B, C, D, E, F, A, B, C, D, E, F, A, B, C, D, E, F, A, B, and C and be mapped with the preamble carrier set.

18. In 12, the second preamble carrier set 2stPreambleCarrierSet$_n$ may be determined as follows:

$$2ndPreambleCarrierSet_n = n + N_{MN} \cdot k_2 + \gamma \cdot \frac{N_2}{\beta} + \text{floor}\left(\frac{2 \cdot k_2}{N_2}\right)$$

wherein, $N_{MN}$ is the number of the plurality of candidate segment identifiers, n is an index that indicates a segment identifier and has a value between 0 and $N_{MN}-1$, $k_2$ is a running index between 0 and $N_2-1$, $\gamma$ is an offset, $N_2$ is the number of subcarriers included in the second preamble carrier set, $\beta$ is the number of subcarriers allocated to the second preamble when an FFT (Fast Fourier Transform) is 512, and floor(c) is an integer equal to or less than c.

The embodiments of the present invention can distinguish a plurality of adjacent nodes from each other, synchronize the plurality of nodes at the same time, and perform exact synchronization in an interference environment.

DESCRIPTION OF THE EMBODIMENTS

Figure 1:
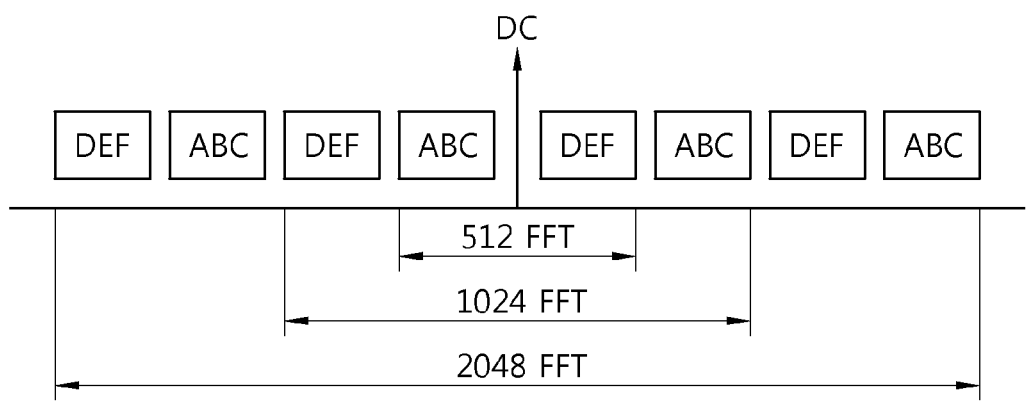
FIG. 1 illustrates a block structure of a second preamble on a frequency axis according to an embodiment of the present invention.

The embodiments of the present invention suggest a first preamble for synchronization between an initial time and fractional frequencies, a second preamble for detection of transmitting nodes and synchronization between integer frequencies, fine times, and fine frequencies, and a third preamble for auto gain control (AGC). The embodiments of the present invention also suggest a method of simultaneously synchronizing a plurality of nodes and exactly synchronizing radio nodes in an interference environment.

Hereinafter, the embodiments of the present invention will be described in detail with reference to the accompanying drawings.

A first preamble according to an embodiment is a preamble for synchronization between an initial time and fractional frequencies as mentioned above and indicates information for a system bandwidth and carrier configuration. A sequence length of the first preamble is 216 regardless of the FFT (Fast Fourier Transform) size, and in the case that a subcarrier index 256 is reserved as DC. The first preamble carrier set 1stPreambleCarrierSet may be determined in Equation 1 to be repeated twice on a time axis:

$$1stPreambleCarrierSet = 2 \cdot k_1 + 41 \quad \text{[Equation 1]}$$

Here, $k_1$ is a running index between 0 and 215.

A second preamble according to an embodiment is a preamble for detection of transmitting nodes and synchronization between integer frequencies, fine times, and fine frequencies as mentioned above. The second preamble indicates a segment identifier. The segment identifier is one of a plurality of candidate segment identifiers and used for obtaining a node identifier. A sequence length of the second preamble varies with the FFT size. For example, the second preamble may be 108, 216, and 432 when the FFT size is 512, 1024, and 2048, respectively.

To discern a plurality of nodes, each node uses a preamble carrier set that is distinguished from adjacent nodes on a frequency axis. In the case that the number $N_2$ of subcarriers in a second preamble carrier set for the second preamble is $\beta$ when FFT size is 512, $2\beta$ when FFT size is 1024, and $4\beta$ when FFT size is 2048, the second preamble carrier set 2stPreambleCarrierSet for the second preamble is determined in Equation 2:

$$2ndPreambleCarrierSet_n = \quad \text{[Equation 2]}$$
$$n + N_{MN} \cdot k_2 + \gamma \cdot \frac{N_2}{\beta} + \text{floor}\left(\frac{2 \cdot k_2}{N_2}\right)$$

Here, n is an index that indicates a segment identifier and has a value between 0 and $N_{MN}-1$. As described above, the second preamble indicates a segment identifier used for obtaining a node identifier and each segment uses one carrier set among $N_{MN}$ candidate carrier sets. For example, segment 0 uses a second preamble carrier set 0, and segment 1 a second preamble carrier set 1. For example, segment n uses a second preamble carrier set n.

$k_2$ is a running index between 0 and $N_2-1$, and γ is an offset. floor(c) is a largest integer equal to or smaller than c.

In Equation 2, it can be seen that the second preamble carrier set is determined considering the number $N_{MN}$ of the candidate segment identifiers. Accordingly, by setting the number $N_{MN}$ of the candidate segment identifiers in consideration of the radio communication system environment according to an embodiment of the present invention, the plurality of nodes can be discerned and synchronized. For example, although a conventional cellular communication system provides maximally three distinctive preamble carrier sets on a frequency axis to distinguish neighboring cells from each other, the embodiments of the present invention are not limited thereto and may provide various preamble carrier sets considering a radio communication system environment.

For the second preamble carrier set to have a robust characteristic for the integer frequency offset, the second preamble may be divided into $N_{SB}$ sub-blocks each of which is mapped with the second preamble carrier set and transmitted.

FIG. 1 illustrates a block structure of a second preamble on a frequency axis according to an embodiment of the present invention.

Referring to FIG. 1, when FFT size is 512, the second preamble includes six basic sub-blocks A, B, C, D, E, and F and is mapped with the second preamble carrier set in order of A, B, C, D, E, and F. When FFT size is 1024, the second preamble has the basic sub-blocks repeated in order of D, E, F, A, B, C, D, E, F, A, B, and C and is mapped with the preamble carrier set. When FFT size is 2048, the second preamble has the basic sub-blocks repeated in order of D, E, F, A, B, C, D, E, F, A, B, C, D, E, F, A, B, C, D, E, F, A, B, and C and is mapped with the preamble carrier set. For example, the second preamble may be recursively shifted for each sub-block. Equation 3 shows an example of determining the second preamble carrier set 2stPreambleCarrierSet reflecting the recursive shift for each sub-block:

$$2ndPreambleCarrierSet_n = \left(n + \text{shift}\left(\text{floor}\left(\frac{k_2}{\beta/N_{SB}}\right)\right)\right) \bmod N_{MN} + \qquad \text{[Equation 3]}$$
$$N_{MN} \cdot k_2 + \gamma \cdot \frac{N_2}{\beta} + \text{floor}\left(\frac{2 \cdot k_2}{N_2}\right)$$

Hereinafter, shift(.) refers to a recursive shift function, and AmodB refers to a remainder when A is divided by B.

For example, in the case that in Equation 3, β=108, γ=40, $N_{MN}$=4, $N_{SB}$=6, the second preamble carrier set 2stPreambleCarrierSet is determined in Equation 4:

$$2ndPreambleCarrierSet_n = \left(n + \text{shift}\left(\text{floor}\left(\frac{k_2}{18}\right)\right)\right) \bmod 4 + 4 \cdot \qquad \text{[Equation 4]}$$
$$k_2 + 40 \cdot \frac{N_2}{108} + \text{floor}\left(\frac{2 \cdot k_2}{N_2}\right)$$

In Equation 4, n is an index indicating a segment identifier and has a value between 0 and 3. Each segment uses one carrier set among four available candidate carrier sets. For example, segment 0 uses a second preamble carrier set 0, and segment 1 uses a second preamble carrier set 1. Segment 2 uses a second preamble carrier set 2, and segment 3 uses a second preamble carrier set 3. Accordingly, it can be seen that four preamble carrier sets are provided.

To reduce PAPR (Peak-to-Average Power Ratio), each sub-block may be multiplied by a block cover sequence.

A third preamble according to an embodiment is a preamble for auto gain control (AGC). A sequence length of the third preamble is $N_3$, regardless of the FFT size, and in the case that a subcarrier index (2*$N_3$+α−2) is reserved as DC. The third preamble carrier set 3rdPreambleCarrierSet is determined in Equation 5 to be repeated four times on a time axis:

$$3rdPreambleCarrierSet = 4 \cdot k_3 + \alpha \qquad \text{[Equation 5]}$$

Here, $k_3$ is a running index between 0 and $N_3-1$, and α is a start subcarrier index. $N_3$ does not exceed the number of all the subcarriers.

Figure 2:
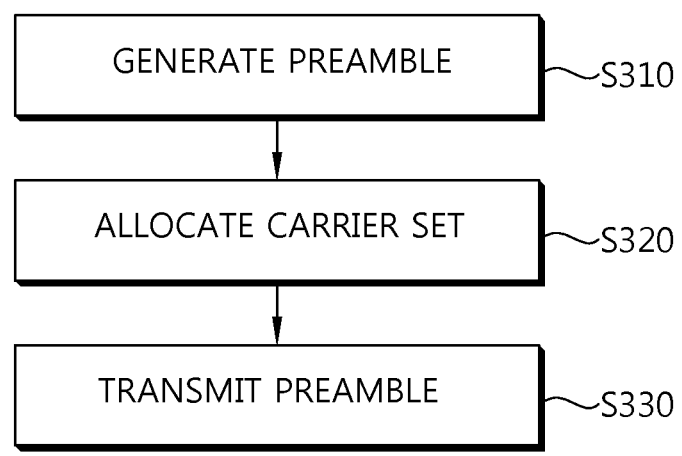
FIG. 2 illustrates a process of transmitting a preamble by a radio node according to an embodiment of the present invention.

The preambles are generated from a transmitting node and transmitted to a receiving node in a radio communication system. FIG. 2 illustrates a process of transmitting a preamble by a radio node according to an embodiment of the present invention.

The process of transmitting a preamble by a radio node in a radio communication system includes a step of generating a preamble (S310), a step of allocating a carrier set (S320), and a step of transmitting the preamble (S330). The steps are not limited as performed in the order above and may be performed in a different order or at the same time.

In a radio communication system, a radio node transmitting preambles is referred to as a transmitting node. The transmitting node generates first and second preambles (S310). As described earlier, the first preamble is a preamble indicating a system bandwidth and carrier configuration and used for estimation of an initial time and fractional frequency offsets. The second preamble indicating a segment identifier is used for detection of a transmitting node and estimation of integer frequency offsets, fine time offsets and fine frequency offsets. The segment identifier is one of a plurality of candidate segments and used for obtaining a node identifier.

The transmitting node allocates the preambles generated in step S310 to carrier sets, respectively (S320). The first preamble is assigned to a first preamble carrier set, and the second preamble is assigned to a second preamble carrier set. The first preamble carrier set and the second preamble carrier set may be determined in Equations 1 and 2. In particular, the second preamble carrier set is determined considering the number of the plurality of candidate segment identifiers.

When the preambles are allocated to the respective carrier sets in step S320, the transmitting node transmits the preambles to a receiving node through the carrier sets (S330). For example, the first preamble is transmitted through the first preamble carrier set, and the second preamble is transmitted through the second preamble carrier set.

The transmitting node may also generate and transmit a third preamble for AGC together with the first and second preambles.

Figure 3:
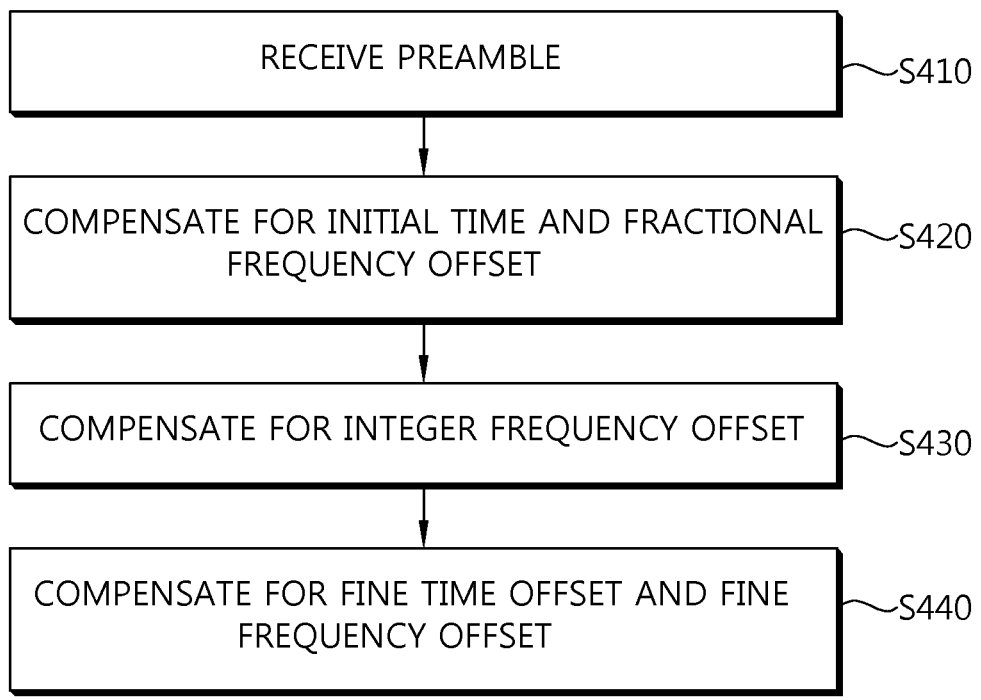
FIG. 3 illustrates a process of synchronizing radio nodes in a radio communication system according to an embodiment of the present invention.

FIG. 3 illustrates a process of synchronizing radio nodes in a radio communication system according to an embodiment of the present invention.

A method of synchronizing radio nodes in a radio communication system includes a step of receiving a preamble (S410), a step of compensating for an initial time and a fractional frequency offset (S420), a step of compensating for an integer frequency offset (S430), and a step of compensating for a fine time offset and a fine frequency offset (S440). The above steps are not limited as performed in the order above and may be performed in a different order or at the same time.

A receiving node, which is a radio node receiving a preamble in a radio communication system and performing a synchronization process, receives first and second preambles (S410). As described above, the first preamble is a preamble indicating a system bandwidth and carrier configuration, and the second preamble is a preamble indicating a segment identifier used for obtaining a node identifier. The receiving node receives the preambles through subcarriers respectively belonging to preamble carrier sets. For example, the first preamble is received through a subcarrier included in the first preamble carrier set, and the second preamble is received through a subcarrier included in the second preamble carrier set. The first preamble carrier set and the second preamble carrier set are determined by the transmitting node. The first preamble carrier set and the second preamble carrier set may be determined in Equations 1 and 2 as described above. In particular, the second preamble carrier set is determined in consideration of the number of a plurality of candidate segment identifiers. The receiving node also receives a third preamble together with the first and second preambles and performs an auto gain control (AGC) process.

The receiving node compensates for an initial time and fractional frequency offset using the first preamble received in step S410 (S420). The initial time and fractional frequency offset compensation step (S420) includes a step of estimating the initial time and fractional frequency offset. The first preamble is auto-correlated in the estimation step to estimate the initial time and fractional frequency offset. The receiving node compensates for the initial time and fractional frequency offset estimated by auto-correlating the first preamble on a time axis.

The receiving node compensates for the integer frequency offset using the second preamble received in step S410 (S430). The integer frequency offset compensation step (S430) includes a step of estimating the integer frequency offset. The receiving node differentially correlates the second preamble and a candidate preamble for the second preamble on a frequency axis to estimate the integer frequency offset. In the radio communication system, preambles use a predetermined sequence and accordingly the receiving node may be aware of a plurality of candidate preambles for the second preamble. Since the second preamble received in the preamble receiving step S410 is one of the plurality of candidate preambles, the receiving node may differentially correlate the second preamble with the plurality of candidate preambles to perform detection of the transmitting node and estimation of the integer frequency offset.

Equations 6 to 9 represent detecting the transmitting node and estimating the integer frequency offset by differentially correlating a vector S which is obtained by expressing the candidate preambles for the second preamble on a frequency axis with a vector Y which is obtained by expressing the second preamble on the frequency axis.

$$C(x, i) = \frac{W(x, i)}{V(x, i)} \quad \text{[Equation 6]}$$

C(x, i) refers to a metric for detection of the transmitting node and estimation of the integer frequency offset. Here, x is an identifier of a candidate preamble for the second preamble, and i is a candidate integer offset. W(x, i) is a value obtained by performing differential correlation between the received second preamble and candidate preamble. V(x, i) is a value for normalizing the size of the differentially correlated value, which is defined in Equation 7:

$$W(x, i) = \sum_{k=0}^{N_2-D-1} \alpha_{k+D}\alpha_k^* \beta_{(k+D,i)} \beta_{(k,i)}^* \quad \text{[Equation 7]}$$

$$V(x, i) = \frac{1}{4\mu} \sum_{k=0}^{N_2-D-1} |\alpha_{k+D}|^2 + |\alpha_k|^2 + \mu|\beta_{(k+D,i)}|^2 + \mu|\beta_{(k,i)}|^2$$

Here, $N_2$ is the number of subcarriers included in the second preamble carrier set, and k and D are predetermined integers. $\alpha$, $\beta$, and $\mu$, variables relating to the second preamble Y and candidate preamble S, are defined in Equation 8:

$$\alpha_k = Y(Lc(k)) \quad \text{[Equation 8]}$$
$$\alpha_{k+D} = Y(Lc(k+D))$$
$$\beta_{(k,i)} = S((Lc(k)+i)\bmod N)$$
$$\beta_{(k+D,i)} = S((Lc(k+D)+i)\bmod N)$$
$$\mu = \frac{1}{N_2} \sum_{k=0}^{N_2-1} Y(Lc(k))$$

Here, Y(.) is an expression of the second preamble on a frequency axis, and S(.) is an expression of the candidate preamble on the frequency axis. Lc(k) refers to a position of a kth subcarrier, and AmodN refers to the remainder when A is divided by the FFT size N.

The transmitting node and integer frequency is determined as ω, i when C(x, i) is maximized. For example, the transmitting node ω and the integer frequency offset $\xi_{integ}$ are expressed in Equation 9:

$$\omega = \arg_x \max C(x,i)$$
$$\xi_{integ} = \arg_i \max C(x,i) \quad \text{[Equation 9]}$$

Here, $\arg_x \max C(x, i)$ refers to the value x when C(x, i) is maximized, and $\arg_i \max C(x, i)$ refers to the value i when C(x, i) is maximized.

The receiving node compensates for the fine time offset and fine frequency offset using the second preamble (S440) and repeats steps S430 and S440 until the entire nodes are synchronized. In the radio communication system, the initial time and fractional frequency offset of the entire nodes are defined as an offset estimated at a first node.

The capability of synchronization process relies on what method is used. According to an embodiment, two methods are used to compensate for the fine time offset and fine frequency offset.

Figure 4:
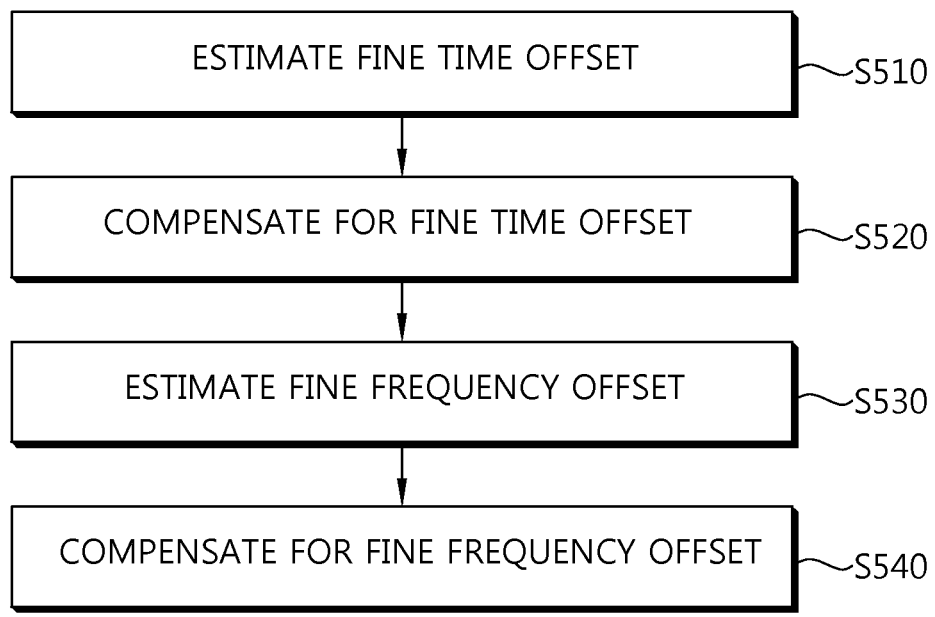
FIG. 4 illustrates a method of compensating for a fine time offset and fine frequency offset according to an embodiment.

FIG. 4 illustrates a method of compensating for a fine time offset and fine frequency offset according to an embodiment.

Referring to FIG. 4, the step of compensating for a fine time offset and fine frequency offset (S440 in FIG. 3) may include a step of estimating a fine time offset (S510), a step of compensating for the fine time offset (S520), a step of estimating a fine frequency offset (S530), and a step of compensating for the fine frequency offset (S540). The above steps are not limited as performed in the order above and may be performed in a different order or at the same time.

The receiving node estimates the fine time offset using the second preamble and a preamble having a node identifier corresponding to the transmitting node (S510). The fine time offset may be obtained through a time axial channel response in the radio communication system. For example, the time axial channel response of the radio communication system is obtained from the second preamble and the preamble having the node identifier corresponding the transmitting node, and the fine time offset may be estimated based on the channel response. The transmitting node may be a node detected in step S430 as described above.

The receiving node compensates for the fine time offset estimated in step S510 (S520) and performs synchronization of the fine time.

The receiving node estimates the fine frequency offset using the second preamble (S530). Equations 10 to 12 represent estimation of the fine frequency offset.

To estimate the fine frequency offset, a predetermined metric $U(\epsilon, n)$ is defined that is obtained by reflecting a candidate frequency offset $\epsilon$ to the second preamble y(n).

$$u(\epsilon,n)=e^{-2\pi\epsilon n}y(n)$$

$$u(\epsilon)=[u(\epsilon,0),u(\epsilon,1),\ldots,u(\epsilon,n),\ldots,u(\epsilon,N-1)]$$

$$U(\epsilon)\text{FFT}(u(\epsilon))=[U(\epsilon,0),U(\epsilon,1)\ldots,U(\epsilon,n),\ldots,U(\epsilon,N-1)] \quad \text{[Equation 10]}$$

Here, N is an FFT size.

It can be possible to obtain power $I(\epsilon)$ and power $J(\epsilon)$ on a frequency axis using $U(\epsilon, n)$ calculated in Equation 10, wherein the power $J(\epsilon)$ is a carrier position that does not correspond to the transmitting node, and power $I(\epsilon)$ is a carrier position that corresponds to the transmitting node.

$$I(\varepsilon) = \sum_{k=0}^{N_2-1} U(\varepsilon, LC(k)) \quad \text{[Equation 11]}$$

$$J(\varepsilon) = \left(\sum_{k=0}^{N-1} U(\varepsilon, k)\right) - I(\varepsilon)$$

Here, $N_2$ is the number of subcarriers included in the second preamble carrier set, and Lc(k) is a location of a kth subcarrier allocated with the second preamble.

The fine frequency offset is determined as a candidate frequency offset when a ratio of $J(\epsilon)$ to $I(\epsilon)$, which is calculated in Equation 11, is maximized. For example, the fine frequency offset $\epsilon_{fine}$ is expressed in Equation 12:

$$\varepsilon_{fine} = \arg_\varepsilon \max \frac{I(\varepsilon)}{J(\varepsilon)} \quad \text{[Equation 12]}$$

Here, $$\arg_\varepsilon \max \frac{I(\varepsilon)}{J(\varepsilon)}$$

refers to $\epsilon$ when the ratio of $J(\epsilon)$ to $I(\epsilon)$ is the maximum.

The receiving node compensates for the fine frequency offset estimated in step S530 (S540) and performs synchronization of the fine frequency offset.

Figure 5:
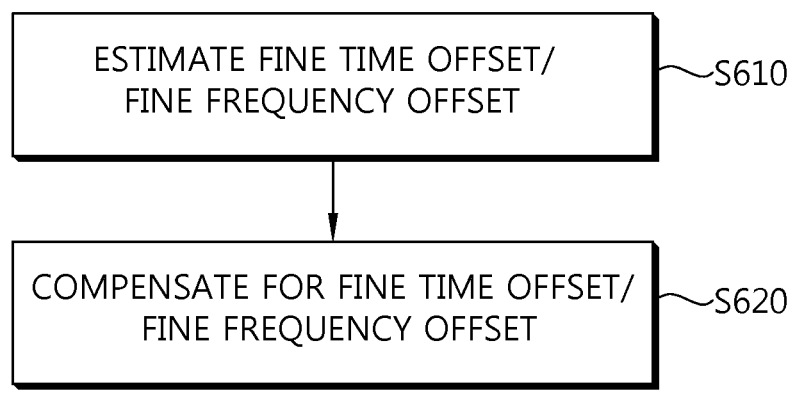
FIG. 5 illustrates a method of compensating for a fine time offset and fine frequency offset according to an embodiment of the present invention.

FIG. 5 illustrates a method of compensating for a fine time offset and fine frequency offset according to an embodiment of the present invention.

Referring to FIG. 5, step S440 (in FIG. 3) may include a step of estimating a fine time offset and fine frequency offset (S610) and a step of compensating for the fine time offset and fine frequency offset (S620).

The receiving node estimates the fine time offset and fine frequency offset using the second preamble (S610). Equations 13 to 16 represent estimating the fine time offset and fine frequency offset.

To estimate the fine time offset and fine frequency offset, a predetermined vector $U(\epsilon)$ is defined that is obtained by reflecting the candidate frequency offset $\epsilon$ to the received second preamble y(n).

$$u(\epsilon,n)=e^{-2\pi\epsilon n}y(n)$$

$$u(\epsilon)=[u(\epsilon,0),u(\epsilon,1),\ldots,u(\epsilon,n),\ldots,u(\epsilon,N-1)]$$

$$U(\epsilon)=\text{FFT}(u(\epsilon)) \quad \text{[Equation 13]}$$

Here, N is an FFT size.

A time axial channel response $h(\epsilon)$ is obtained using a preamble having a node identifier corresponding to the transmitting node and $U(\epsilon)$ calculated in Equation 13. The transmitting node may be a node detected in step S430 as described above.

$$h(\epsilon)=\text{IFFT}(U(\epsilon)\cdot S^*)=[h(\epsilon,0),h(\epsilon,1),\ldots,h(\epsilon,N-1)] \quad \text{[Equation 14]}$$

To minimize influence from multiple paths in the radio communication system, another channel response $h'(\kappa, \epsilon)$ may be defined as a sum of some sections.

$$h'(\kappa, \varepsilon) = \sum_{k=\kappa}^{\kappa+H-1} h(k, \varepsilon) \quad \text{[Equation 15]}$$

Here, k is an integer from which the sections start, and H is an integer which represents the length of the sections.

The fine time offset is determined as k when $h'(\kappa, \epsilon)$ calculated in Equation 15 is the maximum, and the fine frequency offset is determined as c when $h'(\kappa, \epsilon)$ calculated in Equation 15 is maximized. For example, the fine time offset $T_{fine}$ and the fine frequency offset $\epsilon_{fine}$ are expressed in Equation 16:

$$\tau_{fine}=\arg_\kappa\max h'(\kappa,\epsilon)$$

$$\epsilon_{fine}=\arg_\epsilon\max h'(\kappa,\epsilon) \quad \text{[Equation 16]}$$

Here, $\arg_\kappa\max h'(\kappa, \epsilon)$ refers to k when $h'(\kappa, \epsilon)$ is the maximum, and $\arg_\epsilon\max h'(\kappa, \epsilon)$ refers to $\epsilon$ when $h'(\kappa, \epsilon)$ is the maximum.

Figure 6:
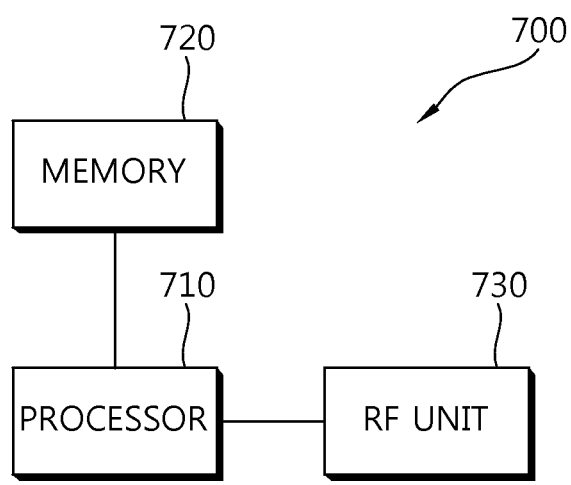
FIG. 6 is a block diagram illustrating a radio node according to an embodiment of the present invention.

FIG. 6 is a block diagram illustrating a radio node according to an embodiment of the present invention.

A radio node 700 includes a processor 710, a memory 720, and a radio frequency (RF) unit 730. The memory 720 is connected to the processor 710 and stores various information to drive the processor 710. The RF unit 730 is connected to the processor 710 and transmits and receives radio signals.

The processor 710 implements the suggested functions, processes, and/or methods. The operation of the radio node described in connection with FIGS. 2 to 5 may be realized by the processor 710. For instance, the processor 710 detects the first preamble that is transmitted through the subcarriers included in the first preamble carrier set and indicates the system bandwidth and carrier configuration. The processor 710 also detects the second preamble that is transmitted through the subcarriers included in the second preamble carrier set and indicates the segment identifier used for obtaining the node identifier.

The processor may include ASICs (Application-Specific Integrated Circuits), other chipsets, logical circuits, and/or data processing devices. The memory may include ROMs (Read-Only Memories), RAMs (Random Access Memories), flash memories, memory cards, card media, and/or storage devices. The RF unit may include a base band circuit for processing radio signals. When implemented in software, the afore-described methods may be embodied in modules (procedures, functions, etc.) performing the functions. The modules may be stored in the memory and may be executed by the processor. The memory may be positioned inside or outside the processor and may be connected to the processor by known means.

Although in the exemplary system the methods are described based on a series of steps or blocks, the steps in the embodiments are not limited as performed order of the steps. For example, the above steps may be performed in different order or at the same time. It can be understood by one of ordinary skill that some of the steps may be omitted without influencing the scope of the invention or some other steps may be included without being excluded from each other.

What is claimed is:

1. A method of transmitting preambles by a radio node, the method comprising:
generating a first preamble indicating a system bandwidth and a carrier configuration;
generating a second preamble indicating a segment identifier used for obtaining a node identifier;
allocating the first preamble to a first preamble carrier set;
allocating the second preamble to a second preamble carrier set corresponding to the segment identifier; and
transmitting the first preamble to a receiving node through the first preamble carrier set and the second preamble to the receiving node through the second preamble carrier set,
wherein the segment identifier is one of a plurality of candidate segment identifiers, and wherein the second preamble carrier set is determined based on the number of the plurality of candidate segment identifiers.

2. The method of claim 1,
wherein the number of the plurality of candidate segment identifiers is equal to or more than four.

3. The method of claim 1,
wherein the second preamble is divided into $N_{SB}$ sub-blocks, and wherein each of the sub-blocks is mapped with the second preamble carrier set and transmitted.

4. The method of claim 3,
wherein when an FFT (Fast Fourier Transform) size is 512, the second preamble is divided into six basic sub-blocks including A, B, C, D, E, and F and mapped with the second preamble carrier set in order of A, B, C, D, E, and F.

5. The method of claim 4,
wherein when the FFT (Fast Fourier Transform) size is 1024, the second preamble has the basic sub-blocks repeated in order of D, E, F, A, B, C, D, E, F, A, B, and C and is mapped with the preamble carrier set.

6. The method of claim 4,
wherein when the FFT (Fast Fourier Transform) size is 2048, the second preamble has the basic sub-blocks repeated in order of D, E, F, A, B, C, D, E, F, A, B, C, D, E, F, A, B, C, D, E, F, A, B, and C and is mapped with the preamble carrier set.

7. The method of claim 1,
wherein the second preamble carrier set 2ndPreambleCarrierSet$_n$ is determined as follows:

$$2ndPreambleCarrierSet_n = n + N_{MN} \cdot k_2 + \gamma \cdot \frac{N_2}{\beta} + \text{floor}\left(\frac{2 \cdot k_2}{N_2}\right)$$

wherein,
$N_{MN}$ is the number of the plurality of candidate segment identifiers,
n is an index that indicates a segment identifier and has a value between 0 and $N_{MN}-1$,
$k_2$ is a running index between 0 and $N_2-1$,
γ is an offset,
$N_2$ is the number of subcarriers included in the second preamble carrier set,
β is the number of subcarriers allocated to the second preamble when an FFT (Fast Fourier Transform) is 512, and
floor(c) is an integer equal to or less than c.

8. A method of synchronizing radio nodes, comprising:
receiving a first preamble indicating a system bandwidth and carrier configuration and a second preamble indicating a segment identifier used for obtaining a node identifier;
compensating for an initial time and fractional frequency offset estimated by auto-correlating the first preamble; and
compensating for an integer frequency offset estimated by differentially correlating a plurality of candidate preambles and the second preamble, respectively,
wherein the segment identifier is one of the plurality of candidate segment identifiers, and wherein the second preamble is one of the plurality of candidate preambles and transmitted through a second preamble carrier set determined based on the number of the plurality of candidate segment identifiers.

9. The method of claim 8,
wherein the number of the plurality of candidate segment identifiers is equal to or more than four.

10. The method of claim 8,
wherein synchronizing the radio nodes comprises,
detecting a transmitting node of the second preamble by differentially correlating the plurality of candidate preambles and the second preamble, respectively;
compensating for a fine time offset estimated using the second preamble and a preamble having a node identifier corresponding to the transmitting node among the plurality of candidate preambles; and
compensating for a fine frequency offset estimated using the second preamble.

11. The method of claim 8,
wherein synchronizing the radio nodes comprises,
detecting a transmitting node of the second preamble by differentially correlating the plurality of candidate preambles and the second preamble, respectively; and
compensating for a fine time offset and a fine frequency offset estimated using the second preamble and a preamble having a node identifier corresponding to the transmitting node among the plurality of candidate preambles.

12. A radio node comprising:
a RF (Radio Frequency) unit configured to transmit and receive a radio signal; and
a processor configured to detect a first preamble transmitted through subcarriers included in a first preamble carrier set, wherein the first preamble indicates a system bandwidth and carrier configuration, and to detect a second preamble transmitted through subcarriers included in a second preamble carrier set, wherein the second preamble indicates a segment identifier used for obtaining a node identifier, wherein the segment identifier is one of a plurality of candidate segment identifiers, and wherein the second preamble carrier set is determined considering the number of the plurality of candidate segment identifiers.

13. The radio node of claim 12, wherein the number of the plurality of candidate segment identifiers is equal to or more than four.

14. The radio node of claim 12, wherein the second preamble is divided into $N_{SB}$ sub-blocks, and wherein each of the sub-blocks is mapped with the second preamble carrier set and transmitted.

15. The radio node of claim 14, wherein when an FFT (Fast Fourier Transform) size is 512, the second preamble is divided into six basic sub-blocks including A, B, C, D, E, and F and mapped with the second preamble carrier set in order of A, B, C, D, E, and F.

16. The radio node of claim 15, wherein when the FFT (Fast Fourier Transform) size is 1024, the second preamble has the basic sub-blocks repeated in order of D, E, F, A, B, C, D, E, F, A, B, and C and is mapped with the preamble carrier set.

17. The radio node of claim 15, wherein when the FFT (Fast Fourier Transform) size is 2048, the second preamble has the basic sub-blocks repeated in order of D, E, F, A, B, C, D, E, F, A, B, C, D, E, F, A, B, C, D, E, F, A, B, and C and is mapped with the preamble carrier set.

18. The radio node of claim 12, wherein the second preamble carrier set 2ndPreambleCarrierSet$_n$ is determined as follows:

$$2ndPreambleCarrierSet_n = n + N_{MN} \cdot k_2 + \gamma \cdot \frac{N_2}{\beta} + \text{floor}\left(\frac{2 \cdot k_2}{N_2}\right)$$

wherein, $N_{MN}$ is the number of the plurality of candidate segment identifiers, n is an index that indicates a segment identifier and has a value between 0 and $N_{MN}-1$, $k_2$ is a running index between 0 and $N_2-1$, $\gamma$ is an offset, $N_2$ is the number of subcarriers included in the second preamble carrier set, $\beta$ is the number of subcarriers allocated to the second preamble when an FFT (Fast Fourier Transform) is 512, and floor(c) is an integer equal to or less than c.

* * * * *